United States Patent
Lye (10) Patent No.: US 12,158,994 B1
(45) Date of Patent: Dec. 3, 2024

(54) OPTICAL NAVIGATION DEVICE AND OPTICAL NAVIGATION METHOD

(71) Applicant: PixArt Imaging Inc., Hsin-Chu (TW)

(72) Inventor: Keng Yeen Lye, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/212,200

(22) Filed: Jun. 21, 2023

(51) Int. Cl.
  *G06F 3/03* (2006.01)
  *G06F 3/0354* (2013.01)
  *G06F 3/038* (2013.01)

(52) U.S. Cl.
  CPC ........ *G06F 3/0317* (2013.01); *G06F 3/03543* (2013.01); *G06F 3/038* (2013.01)

(58) Field of Classification Search
  CPC ..... G06F 3/0317; G06F 3/03543; G06F 3/038
  See application file for complete search history.

(56) References Cited

U.S. PATENT DOCUMENTS

2008/0252602 A1* 10/2008 Kakarala ............... G06F 3/0383
345/166

* cited by examiner

*Primary Examiner* — Lisa S Landis
(74) *Attorney, Agent, or Firm* — Winston Hsu (57) ABSTRACT

An optical navigation device, comprising: an image sensor, comprising a first number of pixels; and a processing circuit, configured to perform following steps: controlling the image sensor to sense a first sensing image by the first number of pixels in a first mode; and controlling the image sensor to perform a pixel binning such that the image sensor senses a second sensing image by a second number of binning pixels in a second mode; wherein the first number is larger than the second number, and each of the binning pixels corresponds to a plurality of the pixels.

20 Claims, 5 Drawing Sheets

|  | Smaller pixel array | Pixel Binning | Pixel Decimation | Smaller COR window | Less DCR bits | Higher Gain | Shutter Adaptn |
|---|---|---|---|---|---|---|---|
| Low surface quality | No | No | No | Yes | No | Yes | Yes |
| High surface quality | Yes | Yes | Yes | Yes | Yes | Yes | Yes |
| Low DPI | Yes | Yes | Yes | Yes | Yes | Yes | Yes |
| High DPI | No | No | No | Yes | No | No | Yes |
| Low Speed | Yes | Yes | Yes | Yes | Yes | Yes | Yes |
| High Speed | No | No | No | No | Yes | Yes | Yes |

FIG. 5

OPTICAL NAVIGATION DEVICE AND OPTICAL NAVIGATION METHOD

BACKGROUND OF THE INVENTION

1. Field of the Invention

The present invention relates to an optical navigation device and an optical navigation method, and particularly relates to an optical navigation device and an optical navigation method which can reduce the required current when a DPI (Dots Per Inch) or a speed thereof is low or a surface which the optical navigation device is tracking has a high quality.

2. Description of the Prior Art

An optical navigation device, such as an optical mouse, may operate at a lower DPI or at a higher DPI, and may move with a lower speed or a higher speed. However, the required sensitivity or precision of the optical navigation device with a lower DPI or a lower speed may be lower than the required sensitivity or precision of the optical navigation device with a higher DPI or a higher speed. Besides, if the optical navigation device is tacking a surface with apparent features, the optical navigation device may not need high level of details of surface images for tracking.

A conventional optical navigation device may have different configurations for different scenarios to improve its performance, but there is no setting to reduce the required current when the optical navigation device operates with a lower DPI, a lower speed or a high surface quality. Accordingly, the power consumption of the optical navigation device is not optimized.

SUMMARY OF THE INVENTION

One objective of the present invention is to provide an optical navigation device which can automatically set configurations corresponding to different conditions.

Another objective of the present invention is to provide an optical navigation method which can automatically set configurations corresponding to different conditions.

One embodiment of the present invention discloses an optical navigation device, comprising: an image sensor, comprising a first number of pixels; and a processing circuit, configured to perform following steps: controlling the image sensor to sense a first sensing image by the first number of pixels in a first mode; and controlling the image sensor to perform a pixel binning such that the image sensor senses a second sensing image by a second number of binning pixels in a second mode; wherein the first number is larger than the second number, and each of the binning pixels corresponds to a plurality of the pixels.

Still another embodiment of the present invention discloses an optical navigation method, applied to an optical navigation device comprising an image sensor with a first number of pixels, comprising: controlling the image sensor to sense a first sensing image by the first number of pixels in a first mode; and controlling the image sensor to perform a pixel binning such that the image sensor senses a second sensing image by a second number of binning pixels in a second mode; wherein the first number is larger than the second number, and each of the binning pixels corresponds to a plurality of the pixels.

Still another embodiment of the present application discloses: an optical sensing device, being movable on a surface, comprising: an image sensor, configured to sense the surface and output image data; and a processing circuit, configured to receive the image data and determine a quality of the surface. The optical sensing device is worked on with a first sensing mode when the quality of the surface is lower than a threshold value. The optical sensing device is worked on with a second sensing mode when the quality of the surface is higher than the threshold value. The first sensing mode is a high sensing mode or a slow processing mode. The second sensing mode is a low sensing mode or a fast processing mode.

In view of above-mentioned embodiments, proper configurations of the optical navigation device can be properly selected corresponding to different conditions, such that the required current can be reduced to optimize the power consumption in different conditions.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Additionally, in following embodiments, an optical mouse is used as an example to explain the concepts of the present invention. However, the optical navigation method can be applied to any other optical navigation device. Besides, the optical navigation device can be replaced by any optical sensing device without navigation function.

Figure 1:
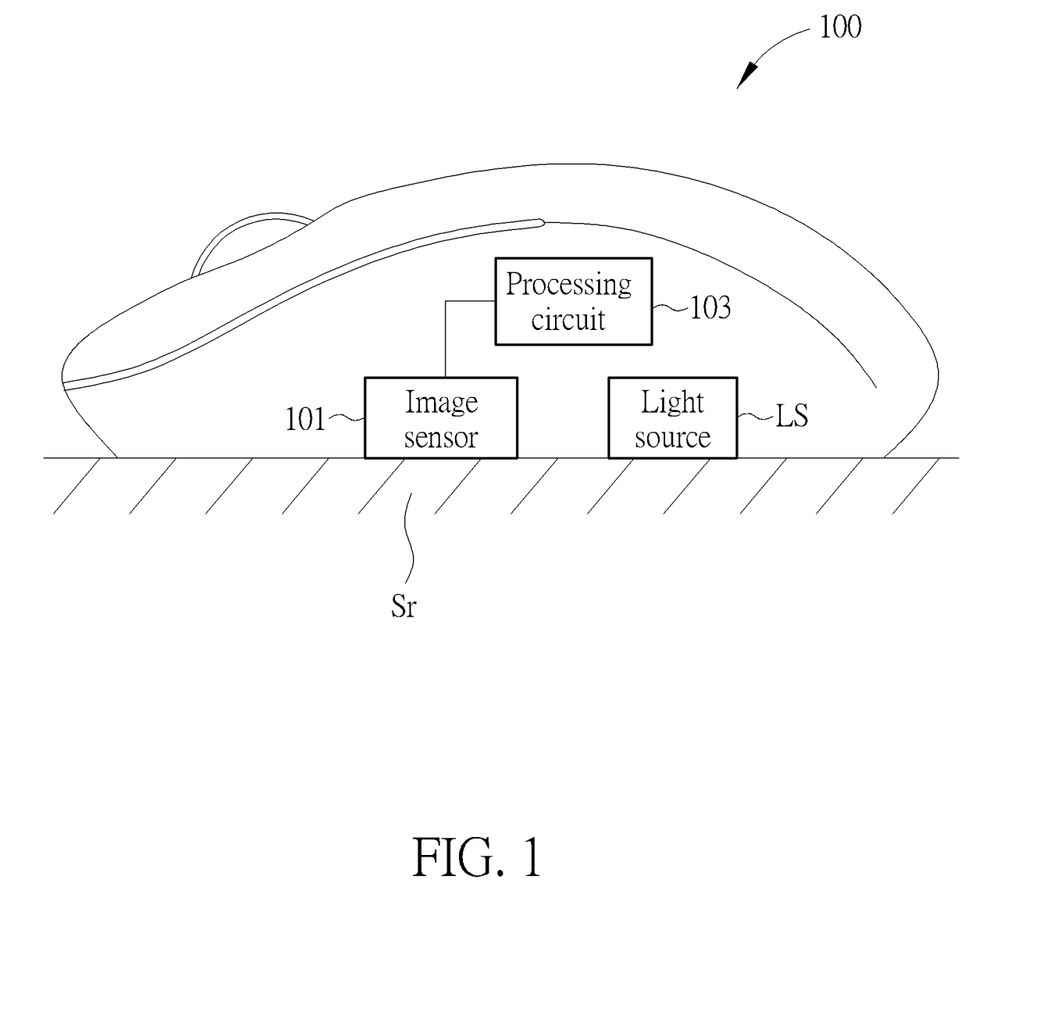
FIG. 1 is a block diagram illustrating an optical mouse according to one embodiment of the present invention.

FIG. 1 is a block diagram illustrating an optical mouse 100 according to one embodiment of the present invention. As shown in FIG. 1, the optical mouse 100 comprises an image sensor 101, a processing circuit 103 and a light source LS. The processing circuit 103 may be integrated to the image sensor 101. In one embodiment, the optical mouse 100 is located on a surface Sr and can perform tracking on the surface Sr. The surface Sr can be any surface, for example, a desk surface or a mouse pad surface. The light source LS is configured to emit light to the surface Sr. The image sensor 101 is configured to capture sensing images generated according to reflected light of light emitted from the light source LS. The image sensor 101 or the processing circuit 103 can compute a movement of the optical mouse 100 according to correlations between different sensing images.

Figure 2:
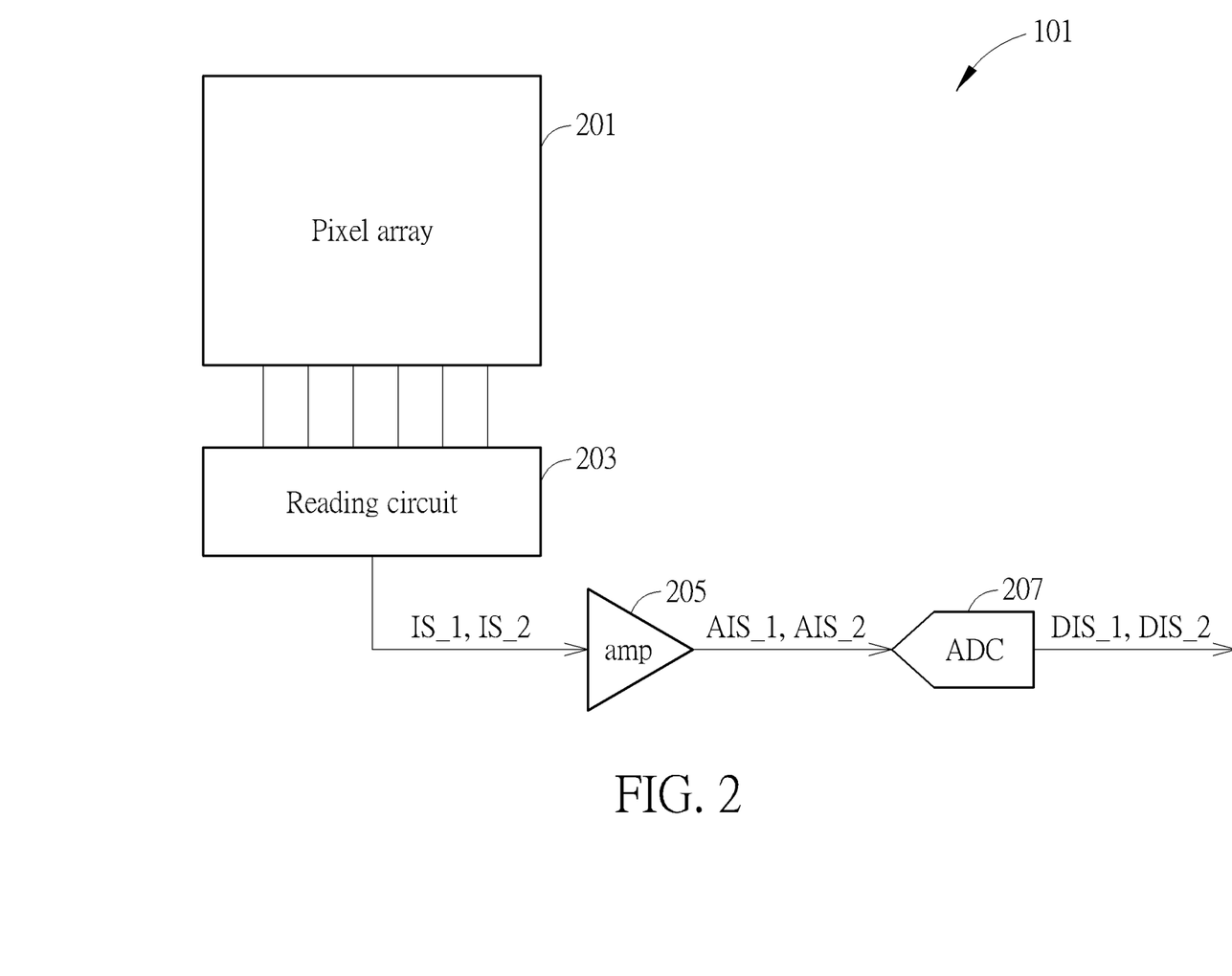
FIG. 2 is a schematic diagram illustrating the image sensor in FIG. 1, according to one embodiment of the present invention.

FIG. 2 is a schematic diagram illustrating the image sensor 101 in FIG. 1, according to one embodiment of the present invention. As shown in FIG. 2, the image sensor 101 comprises a pixel array 201, a reading circuit 203, an amplifier 205 and an ADC (Analog to Digital Converter) 207. The pixel array 201 comprises a plurality of pixels, which can generate and store charges responding to received light. The reading circuit 203 is configured to read the charges stored in the pixels to generate image signals (only two image signals IS_1, IS_2 are symbolized for explaining), which are analog signals. The amplifier 205 is configured to amplify the image signals IS_1, IS_2 to generate amplified image signals AIS_1, AIS_2. The ADC 207 is configured to convert the amplified image signals AIS_1, AIS_2 to digital image signals DIS_1, DIS_2. The digital image signals DIS_1, DIS_2 can be transmitted to following circuits for processing. For example, the digital image signals DIS_1, DIS_2 can be used to generate sensing images for tracking.

The processing circuit 103 is configured to perform the optical navigation method provided by the present invention, to reduce the required current of the optical mouse 100. In one embodiment, the processing circuit 103 is configured to perform following steps: control the image sensor 101 to sense a first sensing image by a first number of pixels (e.g., all pixels of the image sensor 101) in a first mode; control the image sensor 101 to perform a pixel binning such that the image sensor 101 senses a second sensing image by a second number of binning pixels in a second mode; wherein the first number is larger than the second number, and each of the binning pixels corresponds to a plurality of the pixels. For example, in one embodiment, 2×2 pixels are combined to a binning pixel. Pixel binning is a process of combining adjacent pixels throughout an image, by summing or averaging their values, during or after the charges are readout. Such process can reduce the amount of data to be processed. Accordingly, the required current can be reduced if the image sensor 101 uses the pixel binning to generate the image signals IS_1, IS_2.

Although the resolution of sensing images may be decreased due to pixel binning, the optical mouse 100 may not need sensing images with high resolutions for tracking when it has a low DPI, a low speed or the surface has a high quality. If the surface has a high quality, it may mean that the surface has clear and strong features. For example the surface has a high quality may mean the surface has clear textures.

Also, the pixel array 201 comprises a plurality of rows of pixels and a plurality of columns of pixels. Accordingly, in one embodiment, the processing circuit 103 further performs following steps: using a third number of columns or a third number of rows of the pixels to sense a third sensing image in a third mode; and using a fourth number of columns or a fourth number of rows of the pixels to sense a fourth sensing image in a fourth mode; wherein the third number is larger than the fourth number. Briefly, some columns or rows of pixels are skipped to reduce a size of the sensing image. Such steps are also called "decimation". Besides, such step can also be regarded as using a smaller pixel array. For the convenience of explaining, in following embodiments, a smaller pixel array means the escaped rows or columns are continuous, and "decimation" means the escaped rows or columns are non-continuous. Please note the decimation here can mean some pixels do not sense light to generate charges, or charges of some pixels are not used for following computation. By this way, the required current can be reduced if some columns or some rows are escaped. Although such step may decrease sizes of sensing images, the optical mouse 100 may not need sensing images with large sizes for tracking when it has a low DPI, a low speed or the surface has a high quality.

Besides, the image sensor 103 may use a correlation window to compute correlations between different sensing images. Accordingly, in one embodiment, the processing circuit 103 further performs following steps: controlling the image sensor 101 to use a first correlation window to compute correlations of sensing images in a fifth mode; and controlling the image sensor 101 to use a second correlation window to compute correlations of the sensing images in a sixth mode; wherein the first correlation window is larger than the second correlation window.

For example, the first correlation window is a 5×5 (5 pixels×pixels) window and the second correlation window is a 3×3 window. In other words, the larger the correlation window, the more pixels are used to compute the correlations one time, thus need more power. Accordingly, the required current can be reduced if a smaller correlation window is used. Detail steps of computing correlations are well known by persons skilled in the art. For example, a patent with a patent number U.S. Pat. No. 7,042,439 illustrates information of computing correlations, thus detail steps of computing correlations are omitted here for brevity.

Although such step may decrease sizes of correlation windows, thus the correlation computations may not be effective. However, the optical mouse 100 may not highly need effective correlation computations for tracking when it has a low DPI, a low speed or the surface has a high quality.

In another embodiment, the optical mouse 100 comprises a DC filter, wherein the processing circuit 103 further performs following steps: controlling the DC filter to use a fifth number of DC filter bits to filter DC component of image signals of sensing image sensed by the image sensor in a seventh mode; and controlling the DC filter to use a sixth number of the DC filter bits to filter the DC component in an eighth mode; wherein the fifth number is larger than the sixth number. For the convenience of explaining, the DC filter bit is referred to as the DCR bit for short below.

The more the DCR bits are used, the final image which are generated according to the digital image signals DIS_1, DIS_2 is sharper and have more features. On the opposite, if less DCR bits are used, the final image is non-sharp and has weak features. However, if the surface Sr which the optical mouse 100 is tracking has strong features or the optical mouse 100 has a low DPI or a low speed, the tracking can still be successfully performed even if less DCR bits are used. Also, the required current can be reduced if less DCR bits are used. Details of DC component filtering are well known by persons skilled in the art, such as the patent application with a publication number US 20090237385.

In one embodiment, the processing circuit further performs following steps: sensing a fifth sensing image by the image sensor 101 with a first analog gain in a ninth mode; and sensing a sixth sensing image in a tenth mode by the image sensor with a second analog gain of the image sensor; wherein the first analog gain is lower than the second analog gain. The analog gain means the gain of the amplifier 205 in FIG. 2. Although a higher analog gain may slightly increase the required current. However, the current provided to the light source LS can be decreased if a higher analog gain is used, and a lower current of the light source LS can greatly reduce the total required current of the optical mouse 100. Accordingly, a higher analog gain can reduce the required current of the optical mouse 100.

In one embodiment, the optical mouse 100 comprises a shutter. The image sensor 101 can receive light when the shutter turns on, and the image sensor 101 dose not receive light when the shutter turns off. In such case, the processing circuit 103 further performs following steps: controlling the shutter to provide a first amount of light to the image sensor in an eleventh mode; and controlling the shutter to provide a second amount of light to the image sensor in a twelfth mode; wherein the first amount of light is larger than the second amount of light.

If the optical mouse 100 has a lower DPI or a lower speed, or the surface Sr has a high quality, the sensing images which are used for tracking may not need to be so bright. Accordingly, the shutter can be controlled to provide less light to reduce the required current.

Figure 3:
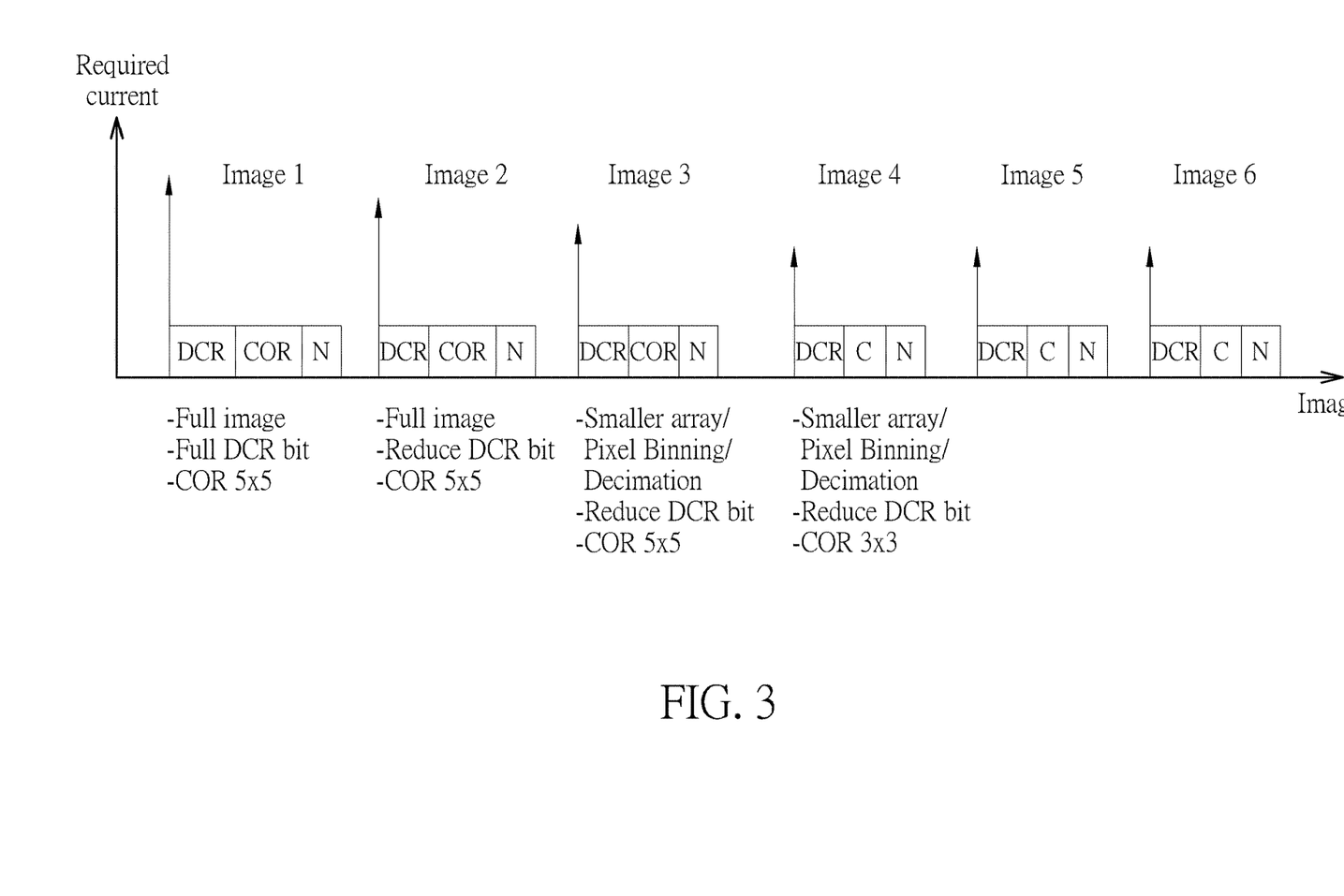
FIG. 3 is a schematic diagram illustrating the relations between the required current and various of parameters of the optical mouse, according to one embodiment of the present invention.

The above-mentioned embodiments can be independently used or simultaneously used. FIG. 3 is a schematic diagram illustrating the relations between the required current and various of parameters of the optical mouse, according to one embodiment of the present invention. The following image 1-6 can mean the above-mentioned sensing images. For the image 1, a full image is used for tracking (i.e., no pixel binning and decimation are used, and a larger image sensor is used). Also, for the image 1, a full DCR bits are used (i.e., more DCR bits are used) and a larger correlation window (5×5 in this example) is used, thus the required current has a maximum value. In the Example 2, a full image is also used for tracking. Further, for the image 2, less DCR bits are used and the larger correlation window is used, thus the required current of the image 2 is less than which of the image 1.

Further, for the image 3, a smaller pixel array is used, and the pixel binning, the decimation are performed. Besides, for the image 3, less DCR bits are used and the larger correlation window is used, thus the required current of the image 3 is less than which of the image 2. Further, for the image 4, a smaller pixel array is used, and the pixel binning, the decimation are performed. Besides, for the image 4, less DCR bits are used and a smaller correlation window is used (3×3 in this example), thus the required current of the image 4 is less than which of the image 3. The configurations of the image 5 and Example 6 are the same as which of the image 4, thus descriptions thereof are omitted here for brevity.

Figure 4:
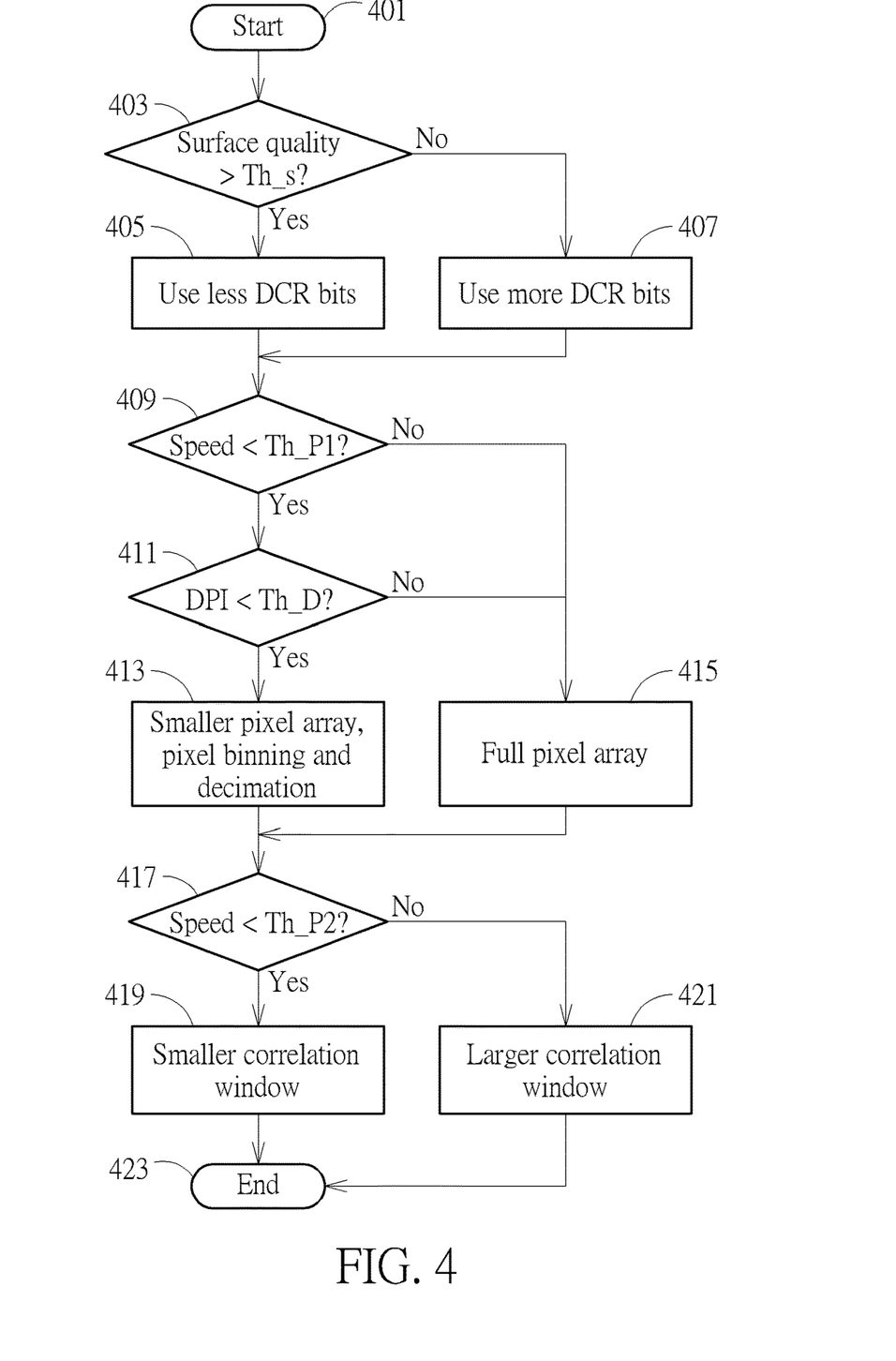
FIG. 4 is a flow chart illustrating an optical navigation method, according to one embodiment of the present invention.

In one embodiment, the optical mouse 100 selectively operates in the above-mentioned modes according to a DPI of the optical mouse 100, a speed of the optical mouse 100, or a surface quality of the above-mentioned surface Sr. FIG. 4 is a flow chart illustrating an optical navigation method, according to one embodiment of the present invention. The method illustrated in FIG. 4 comprises following steps:

Step 401
Start the optical navigation method.

In one embodiment, the steps of setting the configurations can be performed by the processing circuit 103 periodically and automatically. In another embodiment, the steps of setting the configurations can be performed by the processing circuit 103 by a trigger command provided by a user. For example, the user can provide the trigger command via a button of the optical mouse 100, a gesture, or via a computed connected to the optical mouse 100.

Step 403
Determine if the surface quality is larger than a quality threshold Th_s. If yes, go to step 405, if not, go to step 407.

In one embodiment, a configuration which causes a maximum required current (e.g., the configurations of the image 1 in FIG. 3) is used to generate at least one reference image. The surface quality can be determined according to an image quality of the reference image. The image quality can be, for example, whether the reference image has strong features or not, or whether the reference image is sharp or not.

Step 405
Use less DCR bits.

Step 407
Use more DCR bits.

Step 409
Determine if the speed of the optical mouse 100 is smaller than a first speed threshold Th_P1. If yes, go to step 411. If not, go to step 415.

Step 411
Determine if the DPI of the optical mouse 100 is smaller than a DPI threshold Th_D. If yes, go to step 413. If not, go to step 415.

Step 413
Use a smaller pixel array, perform the pixel binning and perform the decimation.

Step 415
Use a full pixel array, and do not perform the pixel binning and perform the decimation.

Step 417
Determine if the speed of the optical mouse 100 is smaller than a second speed threshold Th_P2 or not. If yes, go to step 419. If not, go to step 421.

In one embodiment, the first speed threshold Th P1 is larger than the second speed threshold Th P2.

Step 419
Use a smaller correlation window (e.g., a 3 pixel×3 pixel correlation window).
0
Step 421
Use a larger correlation window (e.g., a 5 pixel×5 pixel correlation window).

Step 423
Perform tracking by the optical mouse 100 according to the configurations set in above-mentioned steps.

In view of the steps illustrated in FIG. 4, the processing circuit 103 controls the image sensor 101 to operate in the first mode or the second mode (i.e., perform pixel binning or not) according to a speed or a DPI of the optical mouse 100 (steps 409-415). Also, the processing circuit 103 controls the image sensor 101 to operate in the third mode or the fourth mode (i.e., perform decimation or not) according to a speed or a DPI of the optical mouse 100 (steps 409-415). The processing circuit 103 also controls the image sensor 101 to use a smaller pixel array according to a speed or a DPI of the optical mouse 100 (steps 409-415).

Furthermore, the processing circuit 103 controls the image sensor 101 to operate in the fifth mode or the sixth mode (i.e., use a larger or a smaller correlation window) according to a speed of the optical mouse 100 (steps 417-421). Moreover, the processing circuit 103 controls the DC filter to operate in one of the seventh mode and the eighth mode (i.e., use more DCR bits or less DCR bits) according to a surface quality of the surface Sr which the optical mouse 100 is tracking according to a DPI of the optical mouse 100 (steps 403-407).

Figure 5:
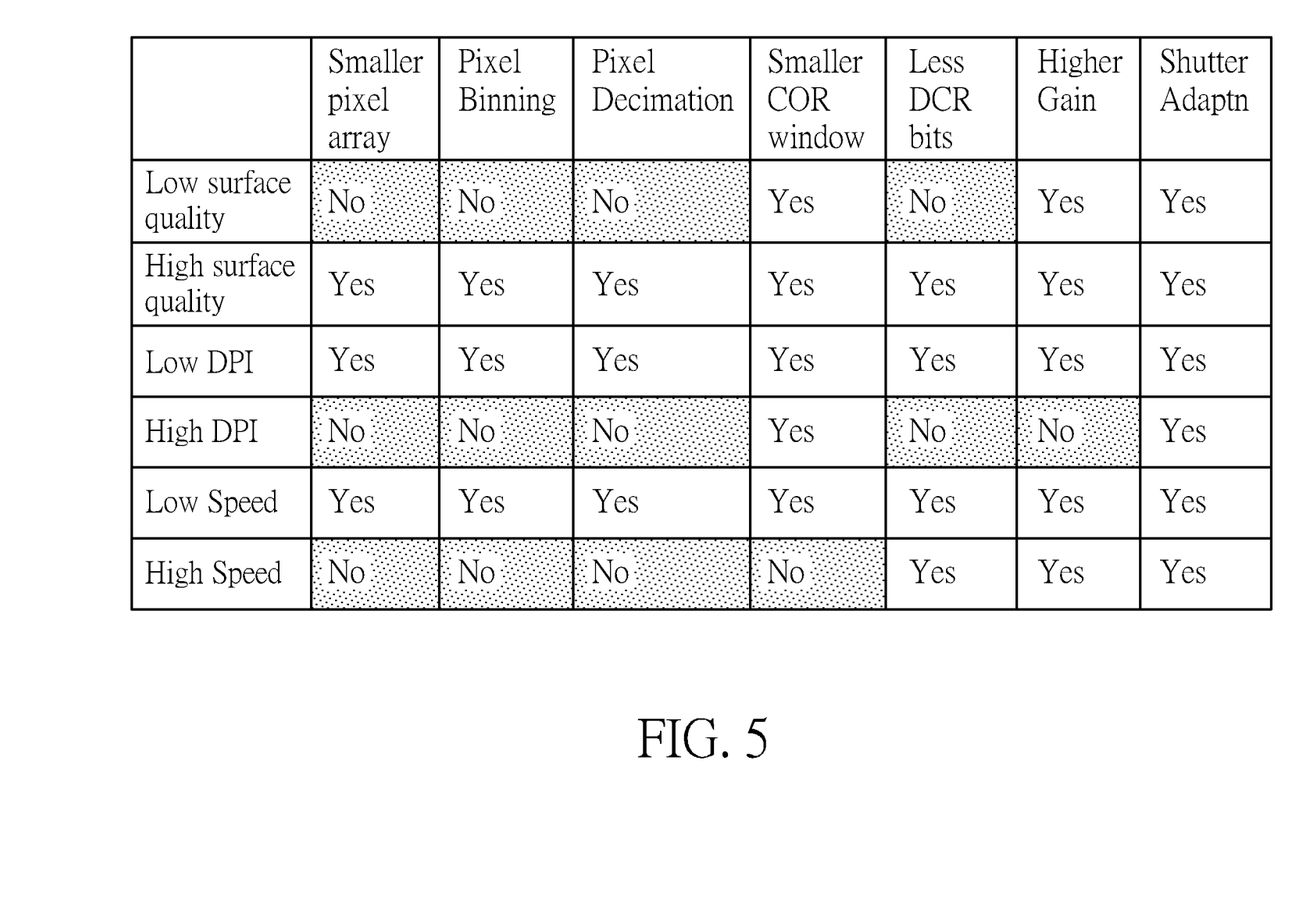
FIG. 5 is a schematic diagram illustrating an optical navigation method, according to one embodiment of the present invention.

The rules of operating in different modes are not limited to the flow chart illustrated in FIG. 4. FIG. 5 is a schematic diagram illustrating an optical navigation method, according to one embodiment of the present invention. In the embodiment of FIG. 5, examples of combinations of various configurations and various conditions are shown. It will be appreciated that the scope of the present invention is not limited to these combinations.

As shown in FIG. 5, if the surface Sr has a low surface quality, a full pixel array is used, and no pixel binning and decimation are performed. Also, a smaller correlation window, more DCR bits and a higher analog gain are used. Additionally, in such example, the shutter provides a smaller amount of light (e.g., the above-mentioned second amount of light). Further, if the optical mouse 100 has a high DPI, a full pixel array is used, no pixel binning and decimation are performed. Also, a smaller correlation window, more DCR bits and a lower analog gain are used. Additionally, in such example, the shutter also provides a smaller amount of light. Other combinations are shown in FIG. 5, thus descriptions thereof are omitted for brevity here.

Based upon above-mentioned embodiment, the present invention discloses an optical sensing device which can operate in different modes corresponding to different surface qualities. The names of modes can be different from the above-mentioned embodiments. Accordingly, in one embodiment, the present invention discloses an optical sensing device which is movable on a surface. The optical sensing device comprises an image sensor (e.g., the image sensor 101 in FIG. 1) and a processing circuit (e.g., the i processing circuit 103 in FIG. 1). The image sensor is configured to sense the surface and output image data. The processing circuit is configured to receive the image data and determine a quality of the surface.

The optical sensing device is worked on with a first sensing mode when the quality of the surface is lower than a threshold value, and is worked on with a second sensing mode when the quality of the surface is higher than the threshold value. The first sensing mode is a high sensing mode or a slow processing mode (e.g., a larger pixel array, no pixel binning, no pixel decimation or more DCR bits shown in FIG. 5). The second sensing mode is a low sensing mode or a fast processing mode (e.g., a larger pixel array, pixel binning, pixel decimation or less DCR bits shown in FIG. 5).

In view of above-mentioned embodiments, proper configurations of the optical navigation device can be properly selected corresponding to different conditions, such that the required current can be reduced to optimize the power consumption in different conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
   an image sensor, comprising a first number of pixels; and
   a processing circuit, configured to perform following steps:
   controlling the image sensor to sense a first sensing image by the first number of pixels in a first mode, when a surface quality of a surface which the optical navigation device is located on is lower than a quality threshold; and
   controlling the image sensor to perform a pixel binning such that the image sensor senses a second sensing image by a second number of binning pixels in a second mode, when the surface quality is higher than the quality threshold;
   wherein the first number is larger than the second number, and each of the binning pixels corresponds to a plurality of the pixels.

2. The optical navigation device of claim 1, wherein the processing circuit controls the image sensor to operate in the first mode or the second mode according to a speed or a DPI (dots per inch) of the optical navigation device.

3. The optical navigation device of claim 1, wherein the processing circuit further performs following steps:
   using a third number of columns or a third number of rows of the pixels to sense a third sensing image in a third mode; and
   using a fourth number of columns or a fourth number of rows of the pixels to sense a fourth sensing image in a fourth mode;
   wherein the third number is larger than the fourth number.

4. The optical navigation device of claim 3, wherein the processing circuit controls the image sensor to operate in the third mode or the fourth mode according to a speed or a DPI of the optical navigation device.

5. The optical navigation device of claim 1, wherein the processing circuit further performs following steps:
   controlling the image sensor to use a first correlation window to compute correlations of sensing images sensed by the image sensor in a fifth mode; and
   controlling the image sensor to use a second correlation window to compute correlations of the sensing images in a sixth mode;
   wherein the first correlation window is larger than the second correlation window.

6. The optical navigation device of claim 5, wherein the processing circuit controls the image sensor to operate in the fifth mode or the sixth mode according to a speed of the optical navigation device.

7. The optical navigation device of claim 1, comprising a DC filter, wherein the processing circuit further performs following steps:
   controlling the DC filter to use a fifth number of DC filter bits to filter DC component of image signals of sensing image sensed by the image sensor in a seventh mode; and
   controlling the DC filter to use a sixth number of the DC filter bits to filter the DC component in an eighth mode;
   wherein the fifth number is larger than the sixth number.

8. The optical navigation device of claim 7, wherein the processing circuit controls the DC filter to operate in one of the seventh mode and the eighth mode according to the surface quality or according to a DPI of the optical navigation device.

9. The optical navigation device of claim 1, wherein the processing circuit further performs following steps:
   sensing a fifth sensing image by the image sensor with a first analog gain in a ninth mode; and
   sensing a sixth sensing image in a tenth mode by the image sensor with a second analog gain of the image sensor;
   wherein the first analog gain is lower than the second analog gain.

10. The optical navigation device of claim 1, wherein the optical navigation device comprises a shutter, wherein the processing circuit further performs following steps:
    controlling the shutter to provide a first amount of light to the image sensor in an eleventh mode; and controlling the shutter to provide a second amount of light to the image sensor in a twelfth mode;

wherein the first amount of light is larger than the second amount of light.

11. An optical navigation method, applied to an optical navigation device comprising an image sensor with a first number of pixels, comprising:
controlling the image sensor to sense a first sensing image by the first number of pixels in a first mode, when a surface quality of a surface which the optical navigation device is located on is lower than a quality threshold; and
controlling the image sensor to perform a pixel binning such that the image sensor senses a second sensing image by a second number of binning pixels in a second mode, when the surface quality is higher than the quality threshold;
wherein the first number is larger than the second number, and each of the binning pixels corresponds to a plurality of the pixels.

12. The optical navigation method of claim 11, further comprising:
controlling the image sensor to operate in the first mode or the second mode according to a speed or a DPI (dots per inch) of the optical navigation device.

13. The optical navigation method of claim 11, further comprising:
using a third number of columns or a third number of rows of the pixels to sense a third sensing image in a third mode; and
using a fourth number of columns or a fourth number of rows of the pixels to sense a fourth sensing image in a fourth mode;
wherein the third number is larger than the fourth number.

14. The optical navigation method of claim 13, further comprising:
controlling the image sensor to operate in the third mode or the fourth mode according to a speed or a DPI of the optical navigation device.

15. The optical navigation method of claim 11, further comprising:
controlling the image sensor to use a first correlation window to compute correlations of sensing images sensed by the image sensor in a fifth mode; and
controlling the image sensor to use a second correlation window to compute correlations of the sensing images in a sixth mode;
wherein the first correlation window is larger than the second correlation window.

16. The optical navigation method of claim 15, controlling the image sensor to operate in the fifth mode or the sixth mode according to a speed of the optical navigation device.

17. The optical navigation method of claim 11, wherein the image sensor comprises a DC filter, wherein the optical navigation method further comprises:
controlling the DC filter to use a fifth number of DC filter bits to filter DC component of image signals of sensing image sensed by the image sensor in a seventh mode; and
controlling the DC filter to use a sixth number of the DC filter bits to filter the DC component in an eighth mode;
wherein the fifth number is larger than the sixth number.

18. The optical navigation method of claim 17, further comprising:
controlling the DC filter to operate in one of the seventh mode and the eighth mode according to the surface quality or according to a DPI of the optical navigation device.

19. The optical navigation method of claim 11, further comprising:
sensing a fifth sensing image by the image sensor with a first analog gain in a ninth mode; and
sensing a sixth sensing image in a tenth mode by the image sensor with a second analog gain of the image sensor;
wherein the first analog gain is lower than the second analog gain.

20. An optical sensing device, being movable on a surface, comprising:
an image sensor, configured to sense the surface and output image data; and
a processing circuit, configured to receive the image data and determine a quality of the surface,
wherein the optical sensing device is worked on with a first sensing mode when the quality of the surface is lower than a quality threshold,
wherein the optical sensing device is worked on with a second sensing mode when the quality of the surface is higher than the quality threshold,
wherein the first sensing mode is a high sensing mode,
wherein the second sensing mode is a low sensing mode.

* * * * *